(12) United States Patent
Matsuyama (10) Patent No.: US 11,148,637 B2
(45) Date of Patent: *Oct. 19, 2021

(54) ENGINE STARTING DEVICE (71) Applicant: ASAHI DENSO CO., LTD., Hamamatsu (JP)

(72) Inventor: Kazuki Matsuyama, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 185 days.

This patent is subject to a terminal disclaimer.

(21) Appl. No.: 15/850,268

(22) Filed: Dec. 21, 2017

(65) Prior Publication Data

US 2018/0178755 A1 Jun. 28, 2018

(30) Foreign Application Priority Data

Dec. 22, 2016 (JP) .............................. JP2016-249280
Dec. 22, 2016 (JP) .............................. JP2016-249281

(51) Int. Cl.
*B60R 25/04* (2013.01)
*B60R 25/20* (2013.01)
(Continued)

(52) U.S. Cl.
CPC .............. *B60R 25/04* (2013.01); *B60R 25/02* (2013.01); *B60R 25/2063* (2013.01);
(Continued)

(58) Field of Classification Search
CPC ..... B60R 25/04; B60R 25/246; B60R 25/245; B60R 25/241; B60R 25/02;
(Continued)

(56) References Cited

U.S. PATENT DOCUMENTS 5,634,358 A 6/1997 Myers
5,656,867 A * 8/1997 Kokubu ................ B60R 25/021
180/287
(Continued)

FOREIGN PATENT DOCUMENTS

CN 1958378 A 5/2007
EP 1 273 492 A2 1/2003
(Continued)

OTHER PUBLICATIONS

Extended European Search Report issued in Patent Application No. EP 17 20 8392 dated May 24, 2018.
(Continued)

*Primary Examiner* — Paul N Dickson
*Assistant Examiner* — Timothy Wilhelm
(74) *Attorney, Agent, or Firm* — Pearne & Gordon LLP (57) ABSTRACT

An engine starting device includes: a portable unit including a transmitting unit capable of transmitting an ID code inherent to a vehicle; a control unit having a substrate on which a receiving unit receiving the ID code, and a determination unit configured to determine whether the received ID code is a pre-registered legitimate ID are formed; a main body part including an operation knob rotationally operated between an off position and an on position, and fixed between a bar-shaped handle and a speed meter of the vehicle; and a regulation unit configured to regulate a rotational operation of the operation knob, and to release a rotation-regulated state of the operation knob on condition that the received ID code is determined as a legitimate ID. The main body part, the control unit and the regulation unit are integrally formed to configure an integral unit.

12 Claims, 8 Drawing Sheets

(51) Int. Cl.
*B60R 25/02* (2013.01)
*B62K 23/02* (2006.01)
*B62H 5/08* (2006.01)
*B60R 25/24* (2013.01)
*F02N 15/10* (2006.01)

(52) U.S. Cl.
CPC ............ *B60R 25/246* (2013.01); *B62H 5/08* (2013.01); *B62K 23/02* (2013.01); *F02N 15/10* (2013.01); *B60R 2325/306* (2013.01)

(58) Field of Classification Search
CPC .......... B60R 25/2063; B60R 2325/306; B62K 23/02; F02N 11/101
See application file for complete search history.

(56) References Cited

U.S. PATENT DOCUMENTS

| | | | | |
|---|---|---|---|---|
| 5,671,621 | A * | 9/1997 | Watanuki | B60R 25/04 235/493 |
| 6,260,651 | B1 * | 7/2001 | Kokubu | B60R 25/02113 180/287 |
| 6,442,985 | B1 * | 9/2002 | Watanuki | B60R 25/04 70/186 |
| 6,516,640 | B2 * | 2/2003 | Jacobs | B60R 25/02128 70/186 |
| 6,756,698 | B2 * | 6/2004 | Shamoto | B60R 25/04 307/10.1 |
| 6,786,069 | B2 * | 9/2004 | Ochi | B60R 25/02126 70/189 |
| 6,810,700 | B2 * | 11/2004 | Okuno | B60R 25/02126 70/186 |
| 6,941,779 | B2 * | 9/2005 | Shigeyama | B60R 25/02126 70/186 |
| 6,980,672 | B2 * | 12/2005 | Saito | G06K 9/00006 340/5.53 |
| 7,009,479 | B1 * | 3/2006 | Chung | B60R 25/021 335/229 |
| 7,028,515 | B2 * | 4/2006 | Chung | B60R 25/02126 70/186 |
| 7,071,819 | B2 * | 7/2006 | Konno | B60R 25/02 307/10.2 |
| 7,170,399 | B2 * | 1/2007 | Melman | B60R 25/04 340/425.5 |
| 7,299,669 | B1 * | 11/2007 | Chung | B60R 25/02142 70/186 |
| 7,302,817 | B2 * | 12/2007 | Ohtaki | B60R 25/04 70/186 |
| 7,591,158 | B2 * | 9/2009 | Konno | B60R 25/02 70/184 |
| 7,667,348 | B2 * | 2/2010 | Konno | B60R 25/02142 307/10.2 |
| 7,730,752 | B2 * | 6/2010 | Yoshitake | B60R 25/248 70/252 |
| 7,810,363 | B2 * | 10/2010 | Okada | B60R 25/02153 70/186 |
| 7,852,194 | B2 * | 12/2010 | Konno | B60R 25/02 340/13.2 |
| 8,028,552 | B2 * | 10/2011 | Ko | B60R 25/04 70/252 |
| 8,040,225 | B2 * | 10/2011 | Nakamura | B60R 25/24 340/426.13 |
| 8,099,986 | B2 * | 1/2012 | Takeuchi | B60R 25/02113 70/186 |
| 8,130,088 | B2 * | 3/2012 | Unno | B60R 25/02113 307/10.1 |
| 8,237,543 | B2 * | 8/2012 | Umeda | B60R 25/24 340/5.61 |
| 8,408,031 | B2 * | 4/2013 | Hirashita | B60R 25/02153 200/43.01 |
| 8,511,121 | B2 * | 8/2013 | Tsuruta | B60R 25/24 340/5.72 |
| 8,511,202 | B2 * | 8/2013 | Mizushima | G05G 5/06 74/527 |
| 9,145,109 | B2 * | 9/2015 | Kinoshita | B60R 25/04 |
| 9,540,062 | B2 * | 1/2017 | Kinoshita | B60R 25/24 |
| 10,183,648 | B2 * | 1/2019 | Yamamoto | B60R 25/04 |
| 10,239,492 | B2 * | 3/2019 | Yamamoto | B60R 25/241 |
| 10,309,525 | B2 * | 6/2019 | Heo | F16H 59/08 |
| 2002/0067247 | A1 | 6/2002 | Suda et al. | |
| 2003/0024754 | A1 | 2/2003 | Konno et al. | |
| 2003/0231100 | A1 * | 12/2003 | Chung | B60R 25/24 340/5.2 |
| 2003/0233857 | A1 * | 12/2003 | Chung | B60R 25/02126 70/186 |
| 2004/0003632 | A1 * | 1/2004 | Ohtaki | B60R 25/04 70/252 |
| 2004/0051380 | A1 * | 3/2004 | Okada | B60R 25/22 307/10.5 |
| 2004/0129041 | A1 | 7/2004 | Shigeyama et al. | |
| 2004/0145449 | A1 * | 7/2004 | Yamamoto | B60R 25/04 340/5.72 |
| 2005/0115757 | A1 | 6/2005 | Konno et al. | |
| 2006/0238296 | A1 | 10/2006 | Konno | |
| 2007/0214849 | A1 | 9/2007 | Yoshitake et al. | |
| 2007/0247280 | A1 | 10/2007 | Nakamura | |
| 2009/0033150 | A1 * | 2/2009 | Ko | B60R 25/045 307/10.6 |
| 2010/0073130 | A1 | 3/2010 | Tsuruta | |
| 2017/0175884 | A1 * | 6/2017 | Watanabe | F16H 59/08 |

FOREIGN PATENT DOCUMENTS

| | | |
|---|---|---|
| EP | 3 254 916 A1 | 12/2017 |
| JP | H04-011587 A | 1/1992 |
| JP | 2002-087368 A | 3/2002 |
| JP | 2004-001642 A | 1/2004 |
| JP | 2004-058880 A | 2/2004 |
| JP | 2005-112048 A | 4/2005 |
| JP | 2006-306161 A | 11/2006 |
| JP | 2007-022120 A | 2/2007 |
| JP | 2007-276633 A | 10/2007 |
| JP | 2007-276765 A | 10/2007 |
| JP | 2010-053648 A | 3/2010 |
| JP | 2010-077613 A | 4/2010 |
| JP | 2015-134593 A | 7/2015 |
| TW | 583111 B | 4/2004 |

OTHER PUBLICATIONS

Japanese Office Action issued in Japanese Patent Application No. 2016-249280 dated Aug. 28, 2020.
Japanese Office Action issued in Japanese Patent Application No. 2016-249281 dated Aug. 28, 2020.
Taiwan Office Action issued in Japanese Patent Application No. 106145081 dated Sep. 7, 2020.

* cited by examiner

ENGINE STARTING DEVICE

CROSS-REFERENCE TO RELATED APPLICATION(S)

This application is based upon and claims the benefit of priority from prior Japanese patent applications No. 2016-249280, filed on Dec. 22, 2016 and No. 2016-249281, filed on Dec. 22, 2016, the entire contents of which are incorporated herein by reference.

BACKGROUND

The present invention relates to an engine starting device configured to allow engine starting on condition that an ID code transmitted from a transmitting unit is determined as a pre-registered legitimate ID.

In recent years, in order to prevent theft of a vehicle to occur at a high level, a so-called smart entry system has been proposed which includes a transmitting unit to be carried by a driver and capable of transmitting an ID code inherent to a vehicle, and a receiving unit capable of receiving the ID code, and which is configured to allow a variety of operations including engine starting on condition that the ID code received by the receiving unit is a legitimate ID. For example, in the case of a smart entry system for a two-wheeled vehicle, when a driver carrying a portable device (transmitting unit) approaches, an ID code transmitted from the transmitting unit is received by a receiving unit provided to the vehicle and is determined whether it is a pre-registered legitimate ID, and an engine starting operation is allowed only when the ID code is a legitimate ID.

Also, regarding the two-wheeled vehicle including the smart entry system, an ignition switch device has been proposed which includes an operation knob, which can be rotationally operated on condition that it is determined that a legitimate ID code is received, and which allows the engine starting by rotationally operating the operation knob (for example, refer to JP-A-2005-112048). The ignition switch device is configured to enable the operation knob to be rotationally operated from an off position to an on position or a lock position, to allow the engine starting at the on position and to lock a bar-shaped handle provided to the vehicle at the lock position.

However, according to the related art, the receiving unit capable of receiving the ID code transmitted from the transmitting unit and the determination unit configured to determine whether the ID code received by the receiving unit is a pre-registered legitimate ID are arranged at positions distant from a main body part having the operation knob formed thereto. Therefore, a relatively long wiring is required between the receiving unit or the determination unit and the main body part, so that a noise is likely to be generated when a signal is transmitted and received via the wiring. Also, according to the related art, since the relatively long wiring is required between the receiving unit or the determination unit and the main body part, the wiring may be susceptible to such mischief that a third party cuts the wiring, for example.

Also, the engine starting device is fixed to a position between the bar-shaped handle and a speed meter of the vehicle. However, in general, wires extending from a brake and a clutch formed at a tip end portion of the bar-shaped handle and a wiring extending from a handle switch fixed to the tip end portion are arranged at the position. In particular, in the case of the normal vehicle, wires, wirings and the like more extend in a right space than in a left space between the bar-shaped handle and the speed meter of the vehicle, as seen from a driver seat-side, so that a spatial room is more left in the left space than in the right space.

SUMMARY

The present invention has been made in view of the above situations, and an object thereof is to provide an engine starting device of a vehicle, to which a smart entry system is to be applied, capable of shortening a wiring between a receiving unit or a determination unit and a main body part.

Also, another object of the present invention is to provide an engine starting device of a vehicle, to which a smart entry system is to be applied, capable of effectively utilizing a left space between a bar-shaped handle and a speed meter of the vehicle, as seen from a driver seat-side.

According to a first aspect of the invention, there is provided an engine starting device comprising: a portable unit which can be carried by a driver, and in which a transmitting unit capable of transmitting an ID code inherent to a vehicle is arranged; a control unit which includes a substrate on which a receiving unit capable of receiving the ID code transmitted from the transmitting unit, and a determination unit configured to determine whether the ID code received by the receiving unit is a pre-registered legitimate ID are formed; a main body part which includes an operation knob configured to be rotationally operated between an off position at which an engine of the vehicle is to be stopped and an on position at which the engine is to be started, and which is capable of being fixed between a bar-shaped handle and a speed meter of the vehicle; and a regulation unit which is configured to regulate a rotational operation of the operation knob, and which is configured to release a rotation-regulated state of the operation knob on condition that the ID code received by the receiving unit is determined as a legitimate ID by the determination unit, wherein the main body part, the control unit and the regulation unit are integrally formed to configure an integral unit.

According to a second aspect of the invention, there is provided an engine starting device comprising: portable unit which can be carried by a driver, and in which a transmitting unit capable of transmitting an ID code inherent to a vehicle is arranged; a control unit which includes a substrate on which a receiving unit capable of receiving the ID code transmitted from the transmitting unit, and a determination unit configured to determine whether the ID code received by the receiving unit is a pre-registered legitimate ID are formed; a main body part which includes an operation knob configured to be rotationally operated between an off position at which an engine of the vehicle is to be stopped and an on position at which the engine is to be started, and which is capable of being fixed between a bar-shaped handle and a speed meter of the vehicle; and a regulation unit which is configured to regulate a rotational operation of the operation knob, and which is configured to release a rotation-regulated state of the operation knob on condition that the ID code received by the receiving unit is determined a legitimate ID by the determination unit, wherein the regulation unit is attached to a right side part of the main body part and the control unit is attached to a left side part of the main body part, as seen from a driver seat-side of the vehicle.

DETAILED DESCRIPTION OF EXEMPLARY EMBODIMENTS

Hereinafter, an illustrative embodiment of the present invention will be specifically described with reference to the drawings.

An engine starting device in accordance with an illustrative embodiment is to control engine starting and stop of a two-wheeled vehicle, and an outer shape thereof is mainly configured by a control unit 5 including a substrate 11 accommodated therein, a main body part 6 having an operation knob 7, and a regulation unit 8 having a solenoid, as shown in FIGS. 1 to 5, for example. The operation knob 7 is configured to be rotationally operated between an off position at which an engine of the vehicle is to be stopped, an on position at which the engine is to be driven, and a lock position at which a bar-shaped handle (H, B) (refer to FIG. 6) provided to the vehicle is to be locked.

Figure 9:
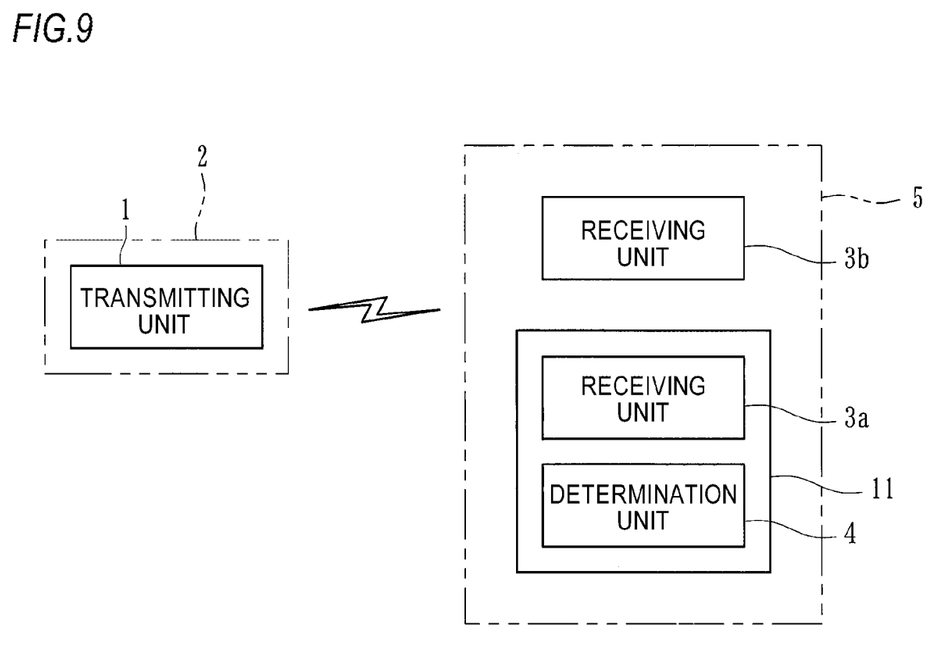
FIG. 9 is a block diagram depicting a transmitting unit, a receiving unit and a determination unit of the engine starting device.

Also, as shown in FIG. 9, the engine starting device in accordance with the illustrative embodiment includes: a portable unit 2 which can be carried by a driver and in which a transmitting unit 1 capable of transmitting an ID code inherent to the vehicle is arranged; a receiving unit (3a, 3b) which is arranged at the vehicle-side and which has an antenna capable of receiving the ID code from the transmitting unit 1; and a determination unit 4 which is configured to determine whether the ID code received by the receiving unit (3a, 3b) is a pre-registered legitimate ID.

The control unit 5 is formed by providing a case with the substrate 11 including the receiving unit 3a and the determination unit 4 formed thereon, and is attached to a side part of the main body part 6 by a bolt or the like. In particular, in the illustrative embodiment, the receiving unit 3a having an RF antenna for performing communication with the portable unit 2 by a low-frequency radio wave and the receiving unit 3b having an LF antenna for performing communication with the portable unit 2 by a high-frequency radio wave are provided, and the receiving units 3a, 3b are arranged in the control unit 5. Also, the receiving unit 3a is a metal press-formed product provided on the substrate 11 arranged in the control unit 5, for example.

The transmitting unit 1 is arranged in the portable unit 2 and can transmit an ID code via a radio wave or the like. When a driver carrying the portable unit 2 approaches to the vehicle and performs a predetermined authentication starting operation (in the illustrative embodiment, an operation of pushing the operation knob 7 to turn on an access switch 9), the receiving unit 3a of the vehicle configured by an antenna and the like can receive the ID code. The determination unit 4 is configured to compare a pre-registered ID code and the ID code received by the receiving unit 3a, and determines that a legitimate ID code is received when the ID codes coincide with each other.

Figure 6:
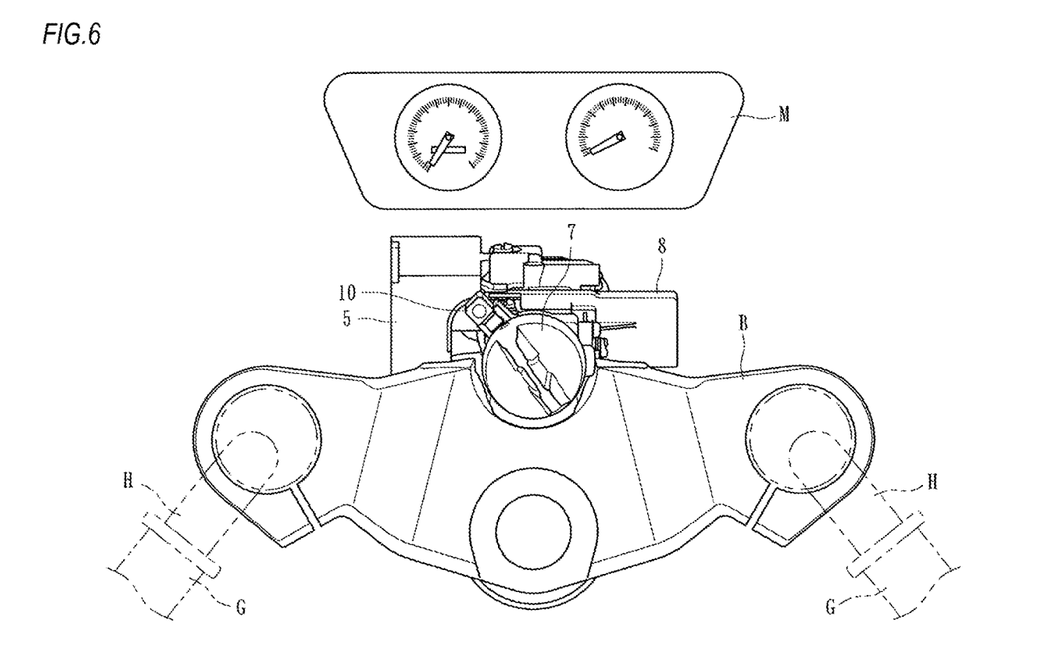
FIG. 6 is a view showing a state where the engine starting device is attached to a vehicle, as seen from a driver seat-side.
Figure 7:
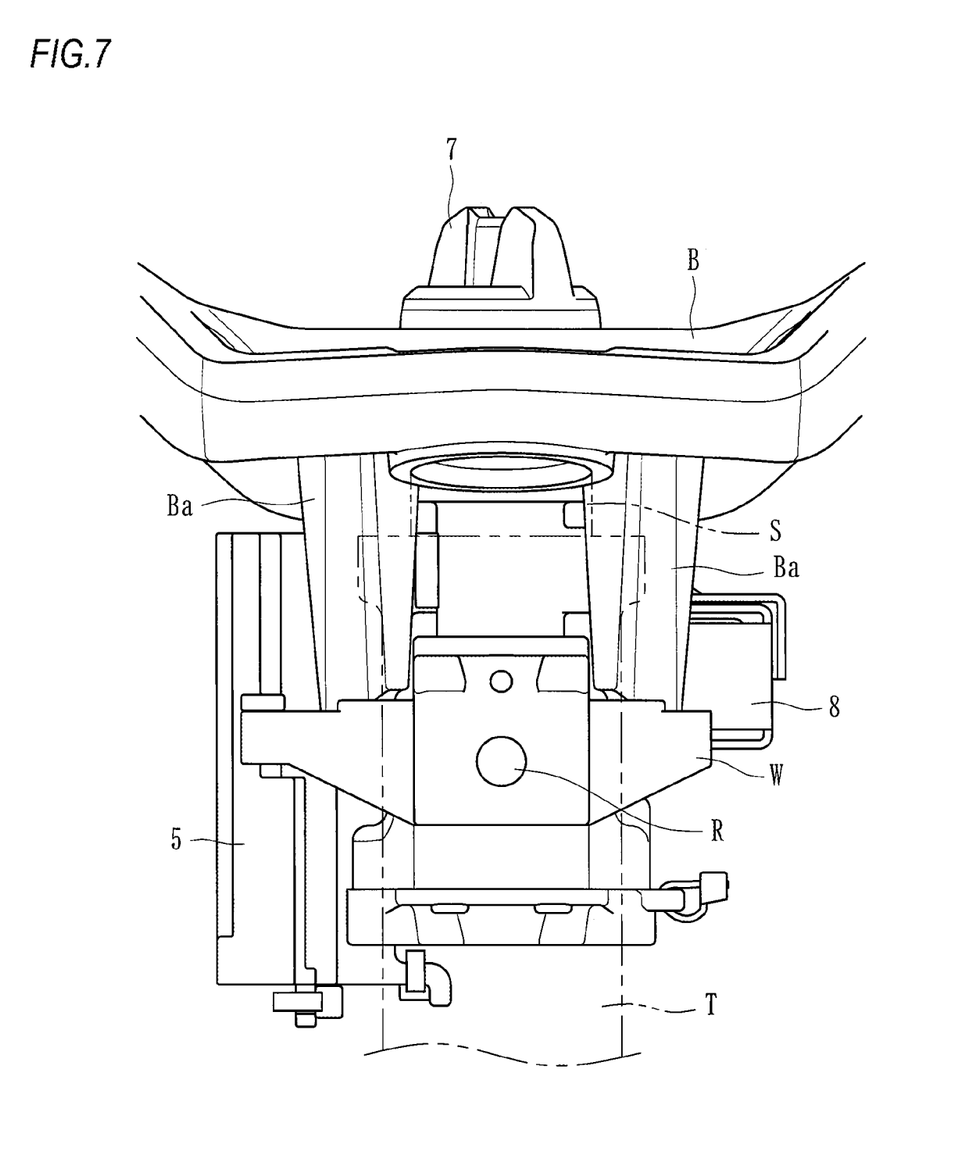
FIG. 7 is a view showing a state where the engine starting device is attached to the vehicle, as seen from the driver seat-side of the vehicle.
Figure 8:
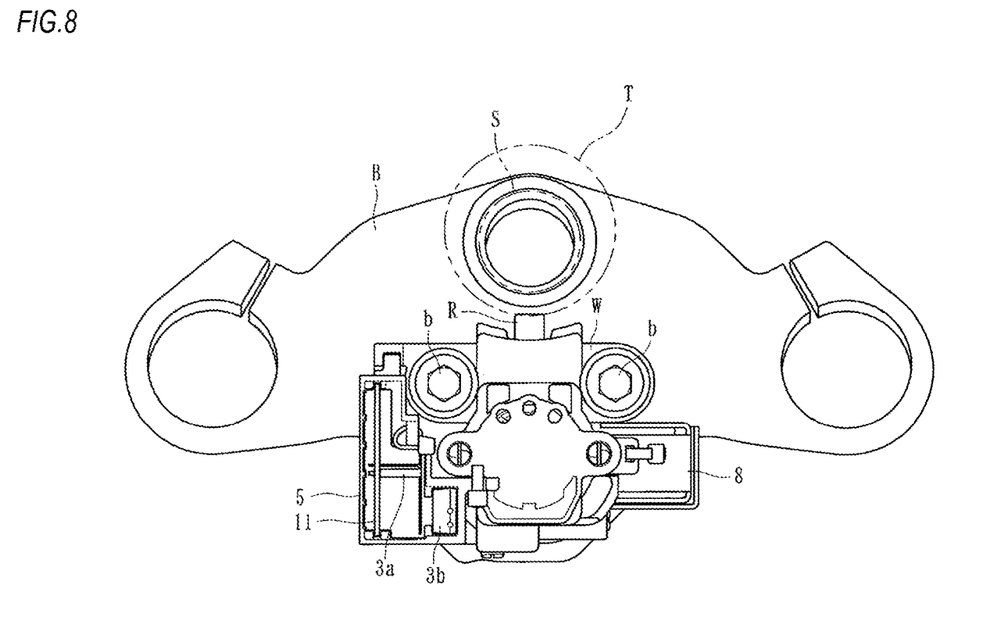
FIG. 8 is a view showing a state where the engine starting device is attached to the vehicle, as seen from below.

The main body part 6 has the operation knob 7 at an upper end portion thereof, and can be fixed between the bar-shaped handle (H, B) and a speed meter M of the vehicle, as shown in FIGS. 6 to 8. Also, the main body part 6 includes the access switch 9 configured by a micro switch, an indicator 10 configured by an LED, a lock bar R and an attachment part W, in addition to the operation knob 7, and is fixed to a handle bracket B formed at a center of the bar-shaped handle of the vehicle.

The handle bracket B is a component configuring the bar-shaped handle of the vehicle. As shown in FIG. 6, handle bars H extend from both right and left sides of the handle bracket B, a grasping grip is formed at a tip end of the right handle bar H, and a throttle grip is formed at a tip end of the left handle bar H. When the handle bars H are rotationally operated leftward or rightward, a steering shaft S can be rotated in conjunction with the handle bracket B, and a front wheel of the vehicle can be steered in the same direction.

Also, as shown in FIG. 7, the handle bracket B is formed with a pair of protrusions Ba. The main body part 6 is attached to the protrusions Ba. That is, the attachment part W of the main body part 6 and the protrusions Ba are fixed to each other by bolts b, as shown in FIG. 8. Thereby, the main body part 6 is fixed to the handle bracket B (the bar-shaped handle), so that the main body part 6 is also rotated as the bar-shaped handle (H, B) is rotated.

Also, the operation knob 7 of the illustrative embodiment can be rotationally operated not only to the off position and the on position but also to the lock position at which the bar-shaped handle (H, B) provided to the vehicle is to be locked, and the main body part 6 is provided with a lock bar R that protrudes to lock the bar-shaped handle (H, B) of the vehicle when the operation knob 7 is rotationally operated to the lock position. That is, when the operation knob 7 is rotationally operated from the off position to the lock position by rotating leftward the bar-shaped handle (H, B) of the vehicle by a predetermined angle, the lock bar R protrudes and can be engaged with an opening (a notch, a hole or the like) formed in a head pipe T of the vehicle, so that the bar-shaped handle (H, B) of the vehicle can be locked.

As described above, the access switch 9 arranged at the main body part 6 is configured by a micro switch, and is turned on when the operation knob 7 is pushed, so that communication for authenticating with the portable unit 2 starts. Also, as described above, the indicator 10 is configured by an LED and is configured to blink or to be lighted on condition that the ID code received by the receiving unit 3a is authenticated as a pre-registered legitimate ID.

In the meantime, a moveable contact, a fixed contact and the like configuring an ignition switch are arranged at the main body part 6 of the illustrative embodiment. Therefore, when the operation knob 7 is rotationally operated from the off position to the on position, the engine of the vehicle is in a starting possible state, and when a separate start button is pushed, the engine can be driven. Also, when the operation knob 7 is rotationally operated from the on position to the off position, it is possible to stop the engine of the vehicle.

The regulation unit 8 is configured to regulate the rotational operation of the operation knob 7, and to release the rotation-regulated state of the operation knob 7 on condition that the ID code received by the receiving unit 3a is determined as a legitimate ID by the determination unit 4. The regulation unit 8 of the illustrative embodiment is configured by a solenoid having an operator (not shown) configured to be displaceable by energization, and is attached to a side part of the main body part 6 with being accommodated in the case. Specifically, the operator of the solenoid configuring the regulation unit 8 is engaged with a coupling member (not shown) configured to couple the operation knob 7 and the ignition switch each other, so that the rotational operation of the operation knob 7 is regulated. When the determination unit 4 determines that a legitimate ID is received, the regulation unit 8 configured by the solenoid is energized, and the coupling member is disengaged, so that the operation knob 7 can be rotationally operated.

In addition, the portable unit 2 of the engine starting device of the illustrative embodiment includes a battery (a button battery) for operating the transmitting unit 1, and the control unit 5 has an immobilizer function capable of generating power for operating the transmitting unit 1, instead of the power by the battery, on condition that a predetermined operation (in the illustrative embodiment, a pushing operation of the access switch 9) is performed in a state where the portable unit 2 approaches within a predetermined distance (for example, about 3 cm).

For example, upon emergency caused due to battery exhaustion of the portable unit 2, when the user pushes the operation knob 7 while bringing the portable unit 2 close to the control unit 5 (particularly, the receiving unit 3a configuring the RF antenna), the radio wave is transmitted from the receiving unit 3a, and the energy of the radio wave is accumulated as the electric energy in a capacitor and the like of the portable unit 2, so that the transmitting unit 1 is operated to perform communication for authentication with the receiving unit 3a.

Herein, the engine starting device of the illustrative embodiment is configured so that the main body part 6, the control unit 5 and the regulation unit 8 are integrally formed to configure an integral unit Y. That is, the control unit 5 and the regulation unit 8 are respectively integrally formed at the side parts of the main body part 6, so that the integral unit Y is configured, which is attached between the bar-shaped handle (specifically, the handle bracket B) and the speed meter M of the vehicle, as shown in FIG. 6.

Figure 1:
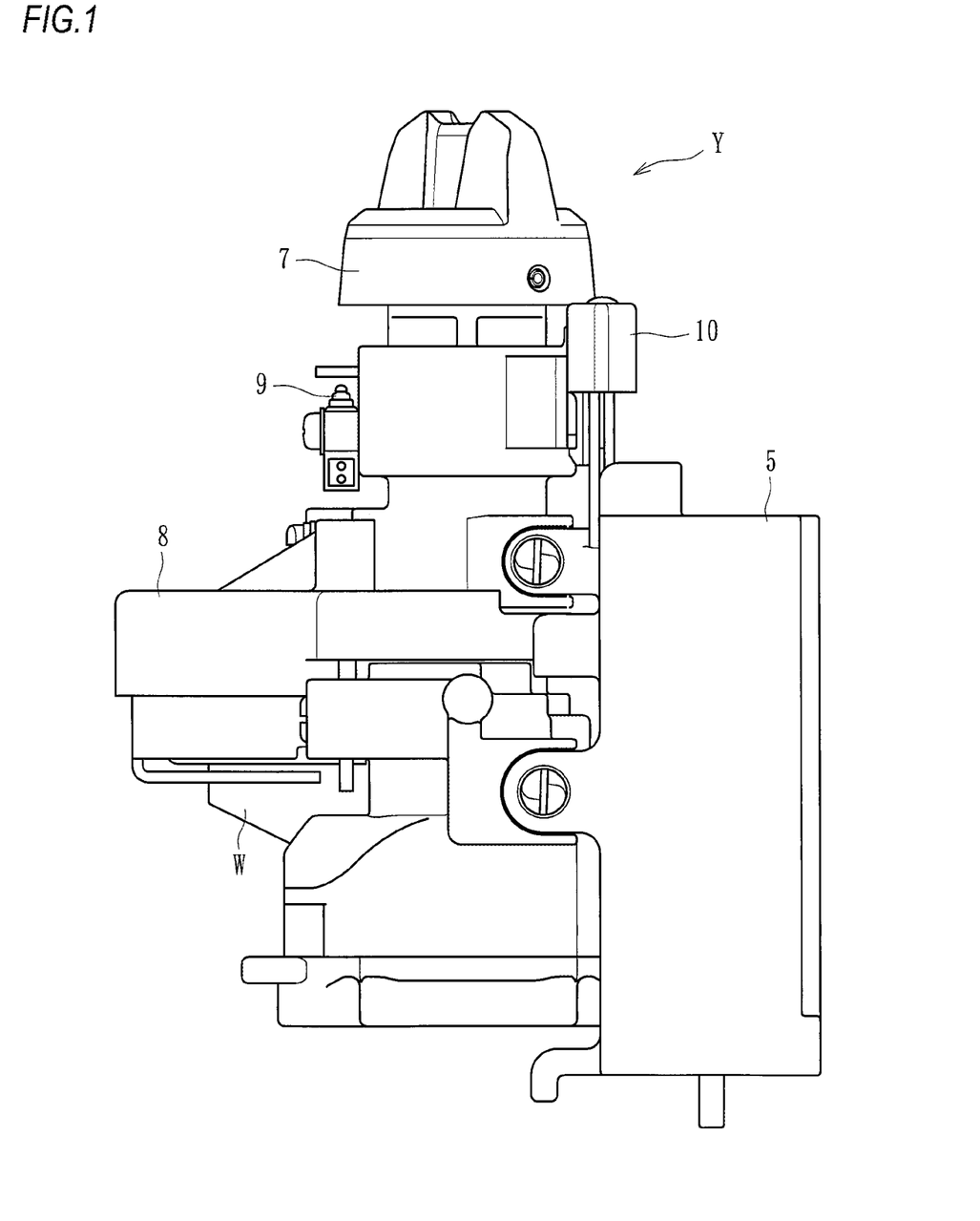
FIG. 1 is a plan view depicting an engine starting device in accordance with an illustrative embodiment.
Figure 2:
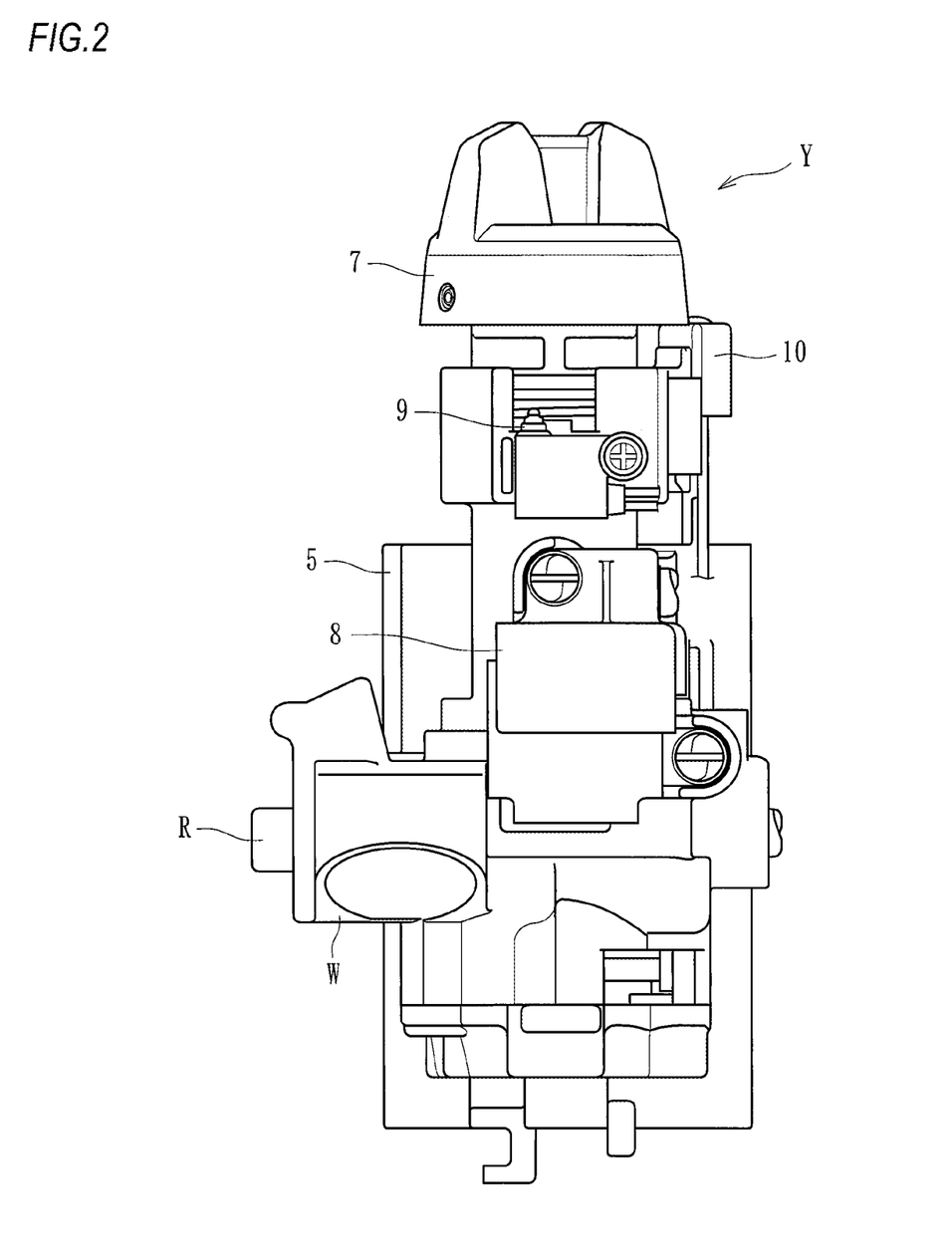
FIG. 2 is a right side view depicting the engine starting device.
Figure 3:
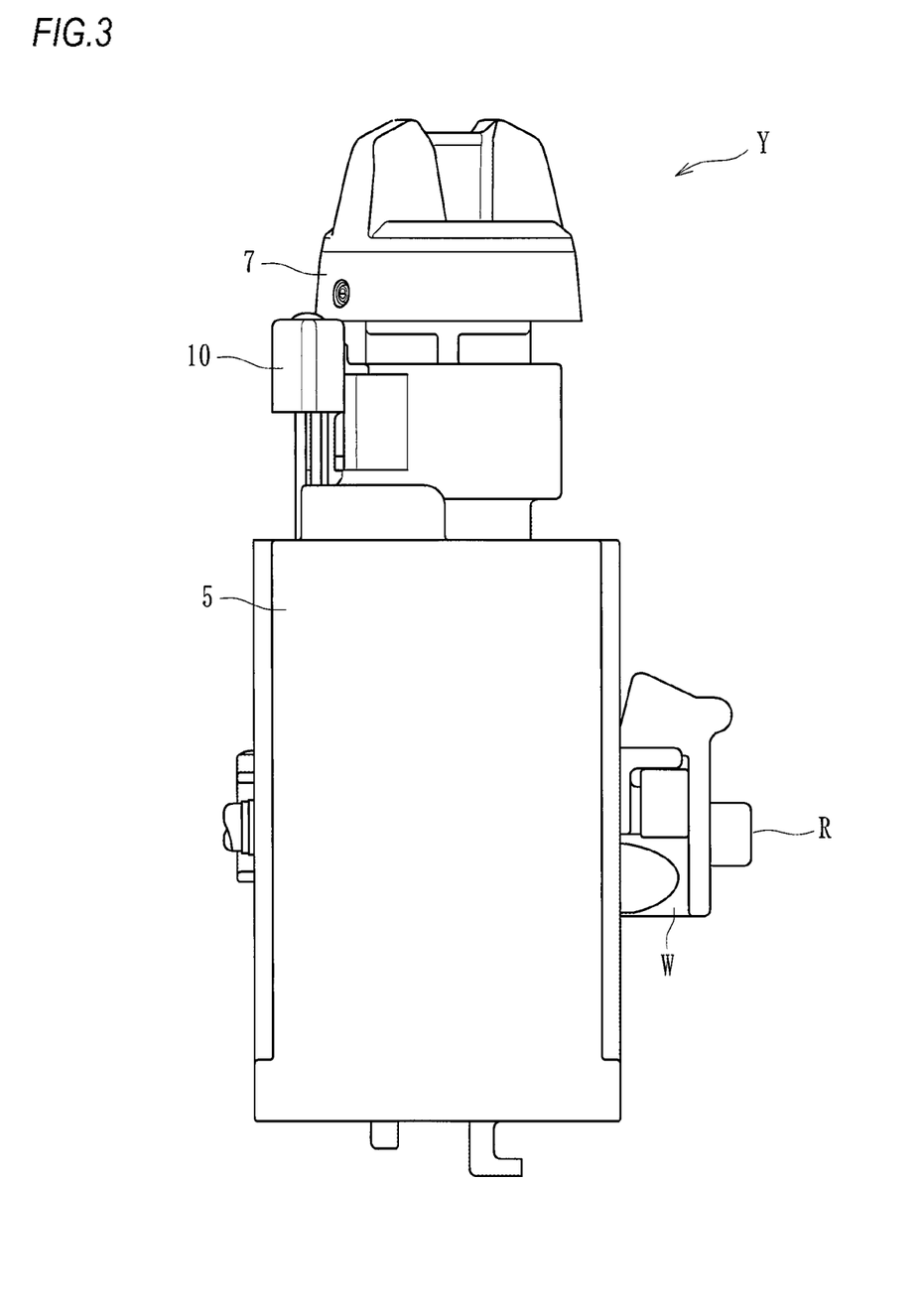
FIG. 3 is a left side view depicting the engine starting device.
Figure 4:
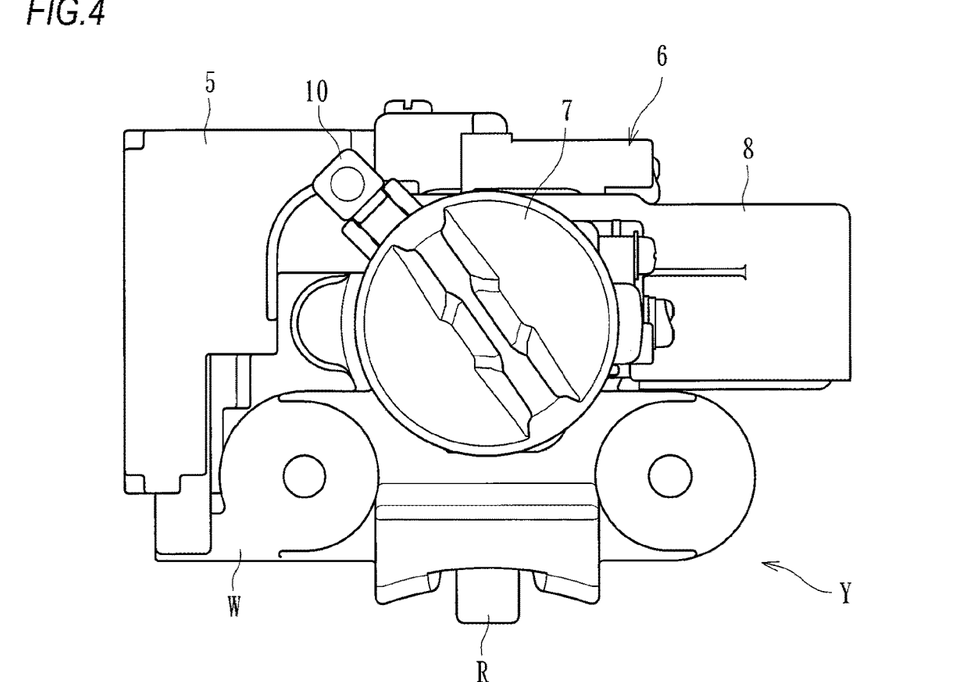
FIG. 4 is a front view depicting the engine starting device.
Figure 5:
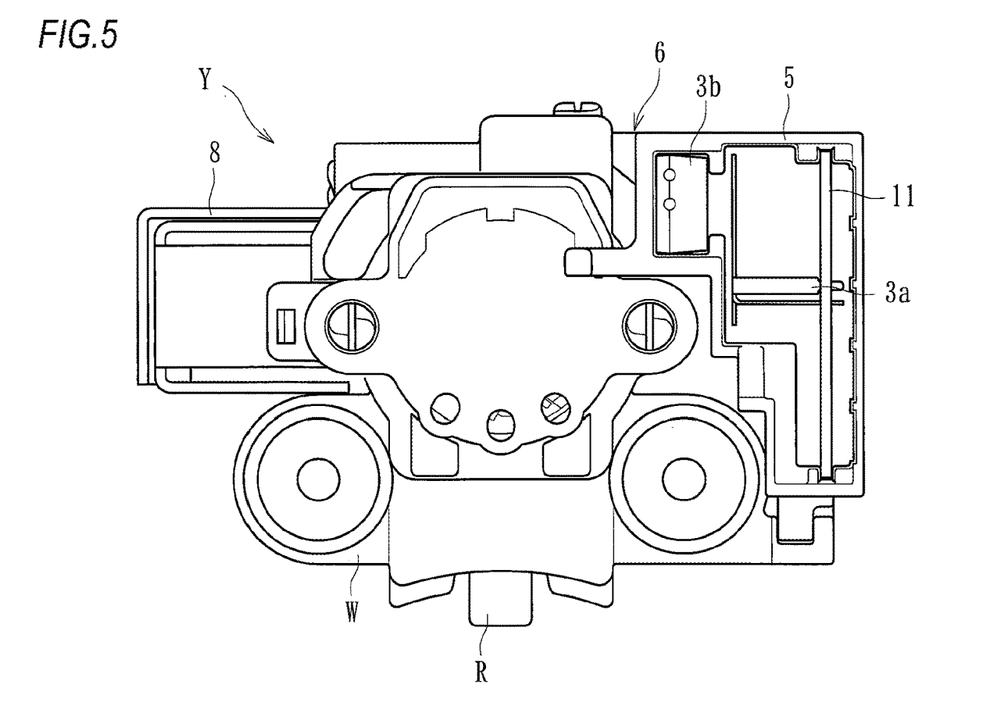
FIG. 5 is a bottom view depicting the engine starting device.

Also, in the illustrative embodiment, as shown in FIGS. 4 and 6, as seen from the driver seat-side of the vehicle, the regulation unit 8 is attached to the right side part of the main body part 6, and the control unit 5 is attached to the left side part of the main body part 6. Meanwhile, since the receiving unit (3a, 3b) requiring a relatively large space is arranged in the control unit 5, a size of the case of the control unit is larger than the case of the regulation unit 8.

According to the illustrative embodiment, the main body part 6, the control unit 5 and the regulation unit 8 are integrally formed to configure the integral unit Y. Therefore, it is possible to shorten the wiring (wiring cord) between the receiving unit (3a, 3b) or the determination unit 4 and the main body part 6 or the regulation unit 8 of the vehicle to which a smart entry system is to be applied, and to suppress the noise in the wiring and the mischief by the third party.

Also, the operation knob 7 of the illustrative embodiment can be rotationally operated not only to the off position and the on position but also to the lock position at which the bar-shaped handle provided to the vehicle is to be locked, and the main body part 6 is provided with the lock bar R that protrudes to lock the bar-shaped handle of the vehicle when the operation knob 7 is rotationally operated to the lock position. Therefore, like an ignition device of a universal vehicle having no smart entry system, it is possible to provide the main body part 6 with the function of locking the bar-shaped handle, in addition to the engine starting and stop.

Also, the main body part 6 of the illustrative embodiment is fixed to the handle bracket B provided at the center of the bar-shaped handle of the vehicle and the control unit 5 and the regulation unit 8 are integrally formed at the side parts of the main body part 6. Therefore, when operating the bar-shaped handle, it is possible to enable the main body part 6, the control unit 5 and the regulation unit 8 to smoothly and favorably follow the operation.

Also, the portable unit 2 includes the battery for operating the transmitting unit 1, and the control unit 5 has an immobilizer function capable of generating power for operating the transmitting unit 1, instead of the power by the battery, on condition that a predetermined operation is performed in a state where the portable unit 2 approaches within a predetermined distance. Therefore, when the battery of the portable unit 2 is exhausted, it is possible to use the immobilizer function as an emergency function.

In addition, according to the illustrative embodiment, as seen from the driver seat-side of the vehicle, the regulation unit 8 is attached to the right side part of the main body part 6, and the control unit 5 is attached to the left side part of the main body part 6. Therefore, regarding a vehicle to which a smart entry system is to be applied, it is possible to effectively utilize the left space between the bar-shaped handle (the handle bracket B) and the speed meter M of the vehicle, as seen from the driver seat-side.

That is, in the case of the normal vehicle, the wires, wirings and the like more extend in the right space than in the left space between the bar-shaped handle (the handle bracket B) and the speed meter M of the vehicle, as seen from the driver seat-side, so that a spatial room is more left in the left space than in the right space. Therefore, the control unit 5 requiring the relatively large case is arranged in the left space, so that it is possible to effectively utilize the space.

Although the illustrative embodiment has been described, the first aspect of the present invention is not limited thereto, and any configuration where the main body part 6, the control unit 5 and the regulation unit 8 are integrally formed to configure the integral unit Y can be adopted. For example, as seen from the driver seat-side of the vehicle, the control unit 5 may be attached to the right side part of the main body part 6, and the regulation unit 8 may be attached to the left side part of the main body part 6. Also, regarding the access switch 9 and the indicator 10, the other types of switches and indicators may also be used, or the access switch 9 and the indicator 10 may not be provided.

Also, the second aspect of the present invention is not limited to the above, and a configuration having other function is also possible inasmuch as the main body part 6, the control unit 5 and the regulation unit 8 are integrally formed to configure the integral unit Y, and the regulation unit 8 is attached to the right side part of the main body part 6 and the control unit 5 is attached to the left side part of the main body part 6, as seen from the driver seat-side of the vehicle. Also, regarding the access switch 9 and the indicator 10, the other types of switches and indicators may also be used, or the access switch 9 and the indicator 10 may not be provided.

The first aspect of the invention provides an engine starting device comprising: a portable unit which can be carried by a driver, and in which a transmitting unit capable of transmitting an ID code inherent to a vehicle is arranged; a control unit which includes a substrate on which a receiving unit capable of receiving the ID code transmitted from the transmitting unit, and a determination unit configured to determine whether the ID code received by the receiving unit is a pre-registered legitimate ID are formed; a main body part which includes an operation knob configured to be rotationally operated between an off position at which an engine of the vehicle is to be stopped and an on position at which the engine is to be started, and which is capable of being fixed between a bar-shaped handle and a speed meter of the vehicle; and a regulation unit which is configured to regulate a rotational operation of the operation knob, and which is configured to release a rotation-regulated state of the operation knob on condition that the ID code received by the receiving unit is determined as a legitimate ID by the determination unit, wherein the main body part, the control unit and the regulation unit are integrally formed to configure an integral unit.

According to the first aspect of the invention, the main body part, the control unit and the regulation unit are integrally formed to configure the integral unit. Therefore, it is possible to shorten the wiring between the receiving unit or the determination unit and the main body part or the regulation unit of the vehicle to which a smart entry system is to be applied, and to suppress the noise in the wiring and the mischief by the third party.

The operation knob may be configured to be rotationally operated to a lock position at which the bar-shaped handle provided to the vehicle is to be locked, in addition to the off position and the on position, and the main body part may be provided with a lock bar which protrudes to lock the bar-shaped handle of the vehicle when the operation knob is rotationally operated to the lock position.

In this case, the operation knob can be rotationally operated not only to the off position and the on position but also to the lock position at which the bar-shaped handle provided to the vehicle is to be locked, and the main body part is provided with the lock bar that protrudes to lock the bar-shaped handle of the vehicle when the operation knob is rotationally operated to the lock position. Therefore, like an ignition device of a universal vehicle having no smart entry system, it is possible to provide the main body part with the function of locking the bar-shaped handle, in addition to the engine starting and stop.

The main body part may be fixed to a handle bracket provided at a center of the bar-shaped handle of the vehicle, and the control unit and the regulation unit may be integrally formed at side parts of the main body part, respectively.

In this case, the main body part is fixed to the handle bracket provided at the center of the bar-shaped handle of the vehicle and the control unit and the regulation unit are integrally formed at the side parts of the main body part, respectively. Therefore, when operating the bar-shaped handle, it is possible to enable the main body part, the control unit and the regulation unit to smoothly and favorably follow the operation.

The portable unit may include a battery for operating the transmitting unit, and the control unit may have an immobilizer function capable of generating power for operating the transmitting unit, instead of power by the battery, on condition that a predetermined operation is performed in a state where the portable unit approaches within a predetermined distance.

In this case, the portable unit includes the battery for operating the transmitting unit, and the control unit has the immobilizer function capable of generating power for operating the transmitting unit, instead of the power by the battery, on condition that a predetermined operation is performed in a state where the portable unit approaches within a predetermined distance. Therefore, when the battery of the portable unit is exhausted, it is possible to use the immobilizer function as an emergency function.

The second aspect of the invention provides an engine starting device comprising: a portable unit which can be carried by a driver, and in which a transmitting unit capable of transmitting an ID code inherent to a vehicle is arranged; a control unit which includes a substrate on which a receiving unit capable of receiving the ID code transmitted from the transmitting unit, and a determination unit configured to determine whether the ID code received by the receiving unit is a pre-registered legitimate ID are formed; a main body part which includes an operation knob configured to be rotationally operated between an off position at which an engine of the vehicle is to be stopped and an on position at which the engine is to be started, and which is capable of being fixed between a bar-shaped handle and a speed meter of the vehicle; and a regulation unit which is configured to regulate a rotational operation of the operation knob, and which is configured to release a rotation-regulated state of the operation knob on condition that the ID code received by the receiving unit is determined a legitimate ID by the determination unit, wherein the regulation unit is attached to a right side part of the main body part and the control unit is attached to a left side part of the main body part, as seen from a driver seat-side of the vehicle.

According to the second aspect of the invention, the regulation unit is attached to the right side part of the main body part and the control unit is attached to the left side part of the main body part, as seen from the driver seat-side of the vehicle. Therefore, regarding a vehicle to which a smart entry system is to be applied, it is possible to effectively utilize the left space between the bar-shaped handle and the speed meter of the vehicle, as seen from the driver seat-side.

The operation knob may be configured to be rotationally operated to a lock position at which the bar-shaped handle provided to the vehicle is to be locked, in addition to the off position and the on position, and the main body part may be provided with a lock bar which protrudes to lock the bar-shaped handle of the vehicle when the operation knob is rotationally operated to the lock position.

In this case, the operation knob can be rotationally operated not only to the off position and the on position but also to the lock position at which the bar-shaped handle provided to the vehicle is to be locked, and the main body part is provided with the lock bar that protrudes to lock the bar-shaped handle of the vehicle when the operation knob is rotationally operated to the lock position. Therefore, like an ignition device of a universal vehicle having no smart entry system, it is possible to provide the main body part with the function of locking the bar-shaped handle, in addition to the engine starting and stop.

The main body part, the control unit and the regulation unit may be integrally formed to configure an integral unit.

In this case, the main body part, the control unit and the regulation unit are integrally formed to configure the integral unit. Therefore, it is possible to shorten the wiring between the receiving unit or the determination unit and the main body part, and to suppress the noise in the wiring and the mischief by the third party.

The portable unit may include a battery for operating the transmitting unit, and the control unit may have an immobilizer function capable of generating power for operating the transmitting unit, instead of power by the battery, on condition that a predetermined operation is performed in a state where the portable unit approaches within a predetermined distance.

The portable unit includes the battery for operating the transmitting unit, and the control unit has the immobilizer function capable of generating power for operating the transmitting unit, instead of the power by the battery, on condition that a predetermined operation is performed in a state where the portable unit approaches within a predetermined distance. Therefore, when the battery of the portable unit is exhausted, it is possible to use the immobilizer function as an emergency function.

The first aspect of the present invention can also be applied to an engine starting device having a different outer shape or other function added thereto inasmuch as it is an engine starting device where the main body part, the control unit and the regulation unit are integrally formed to configure the integral unit.

The second aspect of the present invention can also be applied to an engine starting device having a different outer shape or other function added thereto inasmuch as it is an engine starting where the regulation unit is attached to the right side part of the main body part and the control unit is attached to the left side part of the main body part, as seen from the driver seat-side of the vehicle.

What is claimed is:

1. An engine starting device comprising:
a portable unit which can be carried by a driver, and in which a transmitting unit capable of transmitting an ID code inherent to a vehicle is arranged;
a control unit which includes a substrate on which a receiving unit capable of receiving the ID code transmitted from the transmitting unit, and a determination unit configured to determine whether the ID code received by the receiving unit is a pre-registered legitimate ID are formed;
a main body part which includes an operation knob configured to be rotationally operated between an off position at which an engine of the vehicle is to be stopped and an on position at which the engine is to be started, and which is fixed between a bar-shaped handle and a speed meter of the vehicle; and
a regulation unit which is configured to regulate a rotational operation of the operation knob, and which is configured to release a rotation-regulated state of the operation knob on condition that the ID code received by the receiving unit is determined as a legitimate ID by the determination unit, wherein:
the main body part is fixed to a handle bracket provided at a center portion of the bar-shaped handle of the vehicle, such that the control unit and the regulation unit are arranged at opposite side parts of the main body part, respectively,
the handle bracket is formed with a pair of protrusions at the center portion of the bar-shaped handle, said pair of protrusions extending orthogonally underneath the bar-shaped handle,
the main body part is fixed to the pair of protrusions, and
one of the pair of protrusions is adjacent to the regulation unit, and the other of the pair of protrusions is adjacent to the control unit.

2. The engine starting device according to claim 1, wherein
the operation knob is configured to be rotationally operated to a lock position at which the bar-shaped handle provided to the vehicle is to be locked, in addition to the off position and the on position, and
the main body part is provided with a lock bar which protrudes to lock the bar-shaped handle of the vehicle when the operation knob is rotationally operated to the lock position.

3. The engine starting device according to claim 1, wherein
the portable unit includes a battery for operating the transmitting unit, and
the control unit has an immobilizer function capable of generating power for operating the transmitting unit, instead of power by the battery, on condition that a predetermined operation is performed in a state where the portable unit approaches within a predetermined distance.

4. The engine starting device according to claim 1, wherein
the handle bracket is formed with a protrusion at the center portion of the bar-shaped handle, and the main body part is fixed to the protrusion.

5. The engine starting device according to claim 1, wherein
at least a part of one of the pair of protrusions overlaps with the regulation unit in a direction orthogonal to the bar handle, and at least a part of the other of the pair of protrusions overlaps with the control unit in the direction orthogonal to the bar handle.

6. The engine starting device according to claim 1, wherein the main body part, the control unit and the regulation unit are integrally formed to configure an integral unit.

7. An engine starting device comprising:
a portable unit which can be carried by a driver, and in which a transmitting unit capable of transmitting an ID code inherent to a vehicle is arranged;
a control unit which includes a substrate on which a receiving unit capable of receiving the ID code transmitted from the transmitting unit, and a determination unit configured to determine whether the ID code received by the receiving unit is a pre-registered legitimate ID are formed;
a main body part which includes an operation knob configured to be rotationally operated between an off position at which an engine of the vehicle is to be stopped and an on position at which the engine is to be started, and which is fixed between a bar-shaped handle and a speed meter of the vehicle; and
a regulation unit which is configured to regulate a rotational operation of the operation knob, and which is configured to release a rotation-regulated state of the operation knob on condition that the ID code received by the receiving unit is determined a legitimate ID by the determination unit, wherein:
the main body part is fixed to a handle bracket provided at a center portion of the bar-shaped handle of the vehicle, such that the regulation unit is disposed on and attached to a right side part of the main body part and the control unit is disposed on and attached to a left side part of the main body part, as seen from a driver seat-side of the vehicle,
the handle bracket is formed with a pair of protrusions at the center portion of the bar-shaped handle, said pair of protrusions extending orthogonally underneath the bar-shaped handle,
the main body part is fixed to the pair of protrusions, and
one of the pair of protrusions is adjacent to the regulation unit, and the other of the pair of protrusions is adjacent to the control unit.

8. The engine starting device according to claim 7, wherein
the operation knob is configured to be rotationally operated to a lock position at which the bar-shaped handle provided to the vehicle is to be locked, in addition to the off position and the on position, and
the main body part is provided with a lock bar which protrudes to lock the bar-shaped handle of the vehicle when the operation knob is rotationally operated to the lock position.

9. The engine starting device according to claim 7, wherein
the main body part, the control unit and the regulation unit are integrally formed to configure an integral unit.

10. The engine starting device according to claim 7, wherein
the portable unit includes a battery for operating the transmitting unit, and
the control unit has an immobilizer function capable of generating power for operating the transmitting unit, instead of power by the battery, on condition that a predetermined operation is performed in a state where the portable unit approaches within a predetermined distance.

11. The engine starting device according to claim 7, wherein
the handle bracket is formed with a protrusion at the center portion of the bar-shaped handle, and the main body part is fixed to the protrusion.

12. The engine starting device according to claim 7, wherein
at least a part of one of the pair of protrusions overlaps with the regulation unit in a direction orthogonal to the bar handle, and at least a part of the other of the pair of protrusions overlaps with the control unit in the direction orthogonal to the bar handle.

* * * * *